(12) United States Patent
Bangel et al.

(10) Patent No.: US 7,356,538 B2
(45) Date of Patent: Apr. 8, 2008

(54) CONFIGURABLE BUSINESS CONTROLS TASK NOTIFICATION

(75) Inventors: Matthew Jay Bangel, Poughkeepsie, NY (US); James A. Martin, Jr., Endicott, NY (US); Renee Christine Mullins, Austin, TX (US); Douglas G. Murray, Johnson City, NY (US); Diane Christy Rauch, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 11/043,670

(22) Filed: Jan. 25, 2005

(65) Prior Publication Data

US 2006/0167847 A1    Jul. 27, 2006

(51) Int. Cl.
G06F 17/00 (2006.01)
G06F 17/30 (2006.01)
(52) U.S. Cl. .................. 707/100; 705/9; 707/104.1
(58) Field of Classification Search ............. 707/100, 707/104.1; 705/2, 7, 9; 709/204
See application file for complete search history.

(56) References Cited

U.S. PATENT DOCUMENTS 6,714,913 B2*  3/2004  Brandt et al. ............. 705/2

| | | | |
|---|---|---|---|
| 2002/0064149 A1* | 5/2002 | Elliott et al. | 370/352 |
| 2002/0065828 A1* | 5/2002 | Goodspeed | 707/100 |
| 2003/0131018 A1 | 7/2003 | Godoy et al. | |
| 2004/0003042 A1* | 1/2004 | Horvitz et al. | 709/204 |
| 2004/0193474 A1* | 9/2004 | Digiacomo | 705/9 |
| 2006/0178918 A1* | 8/2006 | Mikurak | 705/7 |

* cited by examiner

Primary Examiner—Sam Rimell
(74) Attorney, Agent, or Firm—John R. Pivnichny; Dillon & Yudell LLP

(57) ABSTRACT

A method for performing business control task notification is proposed. The method comprises processing a combination of one or more databases and one or more user profiles to generate a schedule template and receive a request for a schedule. A computer program product compares attributes of the request for the schedule to a user profile and a schedule template to identify one or more events of the schedule template to be accessed from one or more of a plurality of distributed databases and forms a query to be sent to the one or more distributed databases. The query is sent to a particular database among the plurality of distributed databases. The computer program product receives a positive response to the query, indicating that the particular database contains a first event for the schedule, and the event. In response to receiving the event, the schedule is created. The schedule is stored. One or more current events in the schedule requiring a notification are identified, and the notification is sent to a destination.

8 Claims, 4 Drawing Sheets

CONFIGURABLE BUSINESS CONTROLS TASK NOTIFICATION

BACKGROUND OF THE INVENTION

1. Technical Field

The present invention relates in general to data processing and in particular to improving efficiency of data access, distribution and modification within distributed databases containing diverse event notifications. Still more particularly, the present invention relates to a system, method and computer program product for generating, accessing, distributing and/or modifying events in multiple business control databases that contain event reminders.

2. Description of the Related Art

The profusion of business control schedules, representing processes wherein distributed employees and organizations must complete activities that define the operational compliance of a business with defined standards, has created an entangled and incomprehensible web of activities that must be performed by employees and organizations. Application of these processes runs from governmental compliance such as environmental, health, safety, and accounting regulation to business certifications such as ISO9000 and internal procedures such as information technology and security. In many industrial organizations, employees find themselves bombarded with multiple sets of business controls compliance tasks, coming from multiple sources, with no integrated system for delivery or prioritization.

Conventionally, distributed database systems define and store records, such as user IDs, user groups and other information in a variety of different locations and storage systems related to specific functions. The existing standards-based information storage and retrieval methods (e.g. Distributed Computing Environment (DCE), Lightweight Directory Access Protocol (LDAP), Network Information System (NIS+) and others) were designed to serve disparate purposes.

As can be foreseen from the description of each of the task types listed above, the emphasis on compliance with individual processes has encourage conflicting demands on employees. Further, because of the different purposes driving the designs of the business control procedures listed above, each procedure set has tended to reside within its own administrative tools, requiring employees to learn those tools.

There is presently no adequate mechanism for managing events in multiple business control databases. The increasing need for employees to comply with multiple such business control systems has created an unfulfilled and increasing need for unified management of business control tasks, particularly in large organizations. What is needed is a way to enable integrated interaction with business control schedule events, which are distributed across several storage locations and tied to different tasks, for consolidated management of business control tasks.

SUMMARY OF THE INVENTION

A method for performing business control task notification is proposed. The method comprises processing a combination of one or more databases and one or more user profiles to generate a schedule template and receive a request for a schedule. A computer program product compares attributes of the request for the schedule to a user profile and a schedule template to identify one or more events of the schedule template to be accessed from one or more of a plurality of distributed databases and forms a query to be sent to the one or more distributed databases. The query is sent to a particular database among the plurality of distributed databases. The computer program product receives a positive response to the query, indicating that the particular database contains a first event for the schedule, and the event. In response to receiving the event, the schedule is created. The schedule is stored. One or more current events in the schedule requiring a notification are identified, and the notification is sent to a destination.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
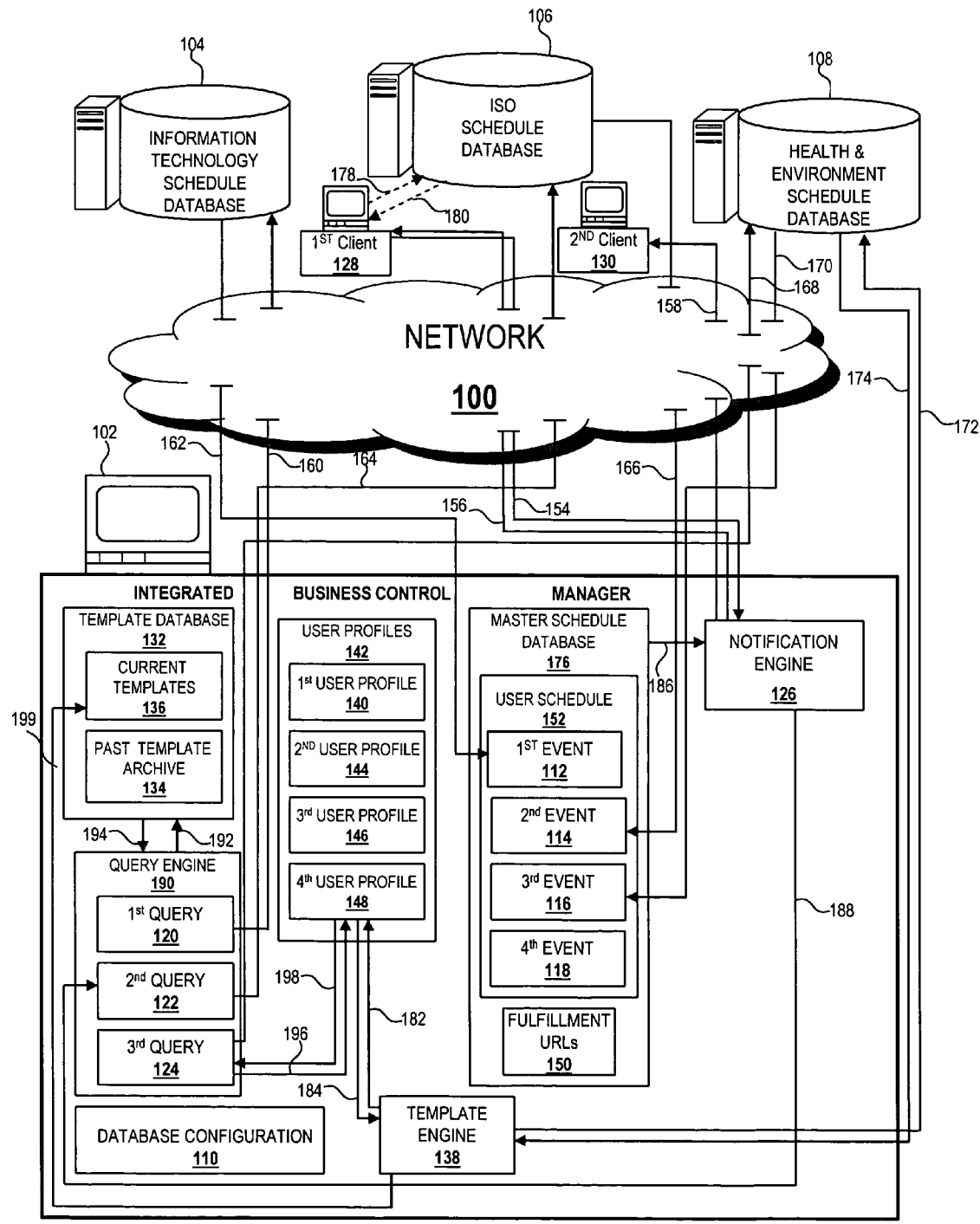
FIG. 1 illustrates a distributed database in a network environment, in which preferred embodiments of the method, system and computer program product for performing business control task notification is implemented.

With reference now to the figures and in particular with reference to FIG. 1, there is depicted an exemplary network environment with which the present invention may be advantageously utilized. The illustrated network environment includes a local or wide area network 100, such as the Internet or another packetized digital network. An integrated control manager data processing system 102, an information technology schedule database 104, an ISO schedule database 106, a health and environment schedule database 108, a first client 128 and a second client 130 are attached to network 100, and communication is enabled through contact and routing information contained in database configuration 110.

Each of information technology schedule database 104, ISO schedule database 106, and health and environment schedule database 108 contains business control schedule events stored in electronic records, representing processes wherein distributed employees and organizations must complete activities. Any employee or organization may be involved in the completion of activities reflected in business control schedules on one or more of information technology schedule database 104, ISO schedule database 106, and health and environment schedule database 108. Employees interact with the schedules created by integrated control manager data processing system 102 through first client 128 and second client 130. Integrated control manager data processing system 102 performs functions related to access and distribution of events stored in electronic records, located on information technology schedule database 104, ISO schedule database 106, and health and environment schedule database 108. Integrated control manager data processing system 102 uses data stored in database configuration 110 to communicate with information technology schedule database 104, ISO schedule database 106, and health and environment schedule database 108 over network 100.

For the purpose of simplifying discussion of the invention itself, many details of integrated control manager data processing system 102, which details are well within that which is known to one of skill in the relevant data processing arts, have been omitted from the discussion of the present invention. The operations of integrated control manager data processing system 102 with respect to information technology schedule database 104, ISO schedule database 106, and health and environment schedule database 108 may be implemented with conventional or later-developed hardware or software.

The functions of integrated control manager data processing system 102 include, but are not limited to access to and distribution of electronic records containing schedule events. In the example shown with respect to integrated control manager data processing system 102, integrated control manager data processing system 102 operates under instructions to assemble, based on the content of a template database 132 a user schedule 152 for a given user profile among user profiles 142 (e.g. first user profile 140, second user profile 144, third user profile 146 and fourth user profile 148) containing a group of schedule events, such as a first event 112, a second event 114, a third event 116, and a fourth event 118. For some of first event 112, second event 114, third event 116, and fourth event 118, integrated control manager data processing system 102 will have access to stored information, hereafter called assignments, sometimes internally stored in template database 132 and sometimes stored on database configuration 110, relating to the location from which some events can be retrieved, but may have no such assignment information relative to the locations from which other events may be retrieved.

User schedule 142 is contained in master schedule database 176 along with fulfillment URLs 150. Fulfillment URLS 150 contains URLs that can be used to help users perform actions associated with specific events. Many of these events can be performed or confirmed by transmission of messages to one of information technology schedule database 104, ISO schedule database 106, and health and environment schedule database 108, such as client-to-database message 178 to ISO schedule database 106 and database-to-client message 180 from ISO schedule database 106. Events from user schedule 152 are sent to first client 128 and second client 130 by notification engine 126. Notification engine 126 is capable of receiving a schedule request 154 from a client, such as first client 128 and sending notification messages, such as notification message 156 to first client 128 and notification message 158 to second client 130. When notification engine 126 receives a schedule request 154 from first client 128, notification engine 126 sends a query request 188 to query engine 190. Query engine 190 sends a template request 192 to template database 132 and receives a template reply 194 in response. Query engine 190 also sends a profile request 196 to user profiles 142 and receives a profile reply 198 in response. Notification engine 126 can also send a notification message 158 in response to receiving a schedule alert 186 from master schedule database 176.

Template engine 138 can send a database request, such as database request 172 to health and environment database 108 and receive a database result transmission 174. Template engine 138 also sends a user profile request 182 to template user profiles 142 and receives a profile result transmission 184. Template engine 138 delivers current templates 136 as a template report 199.

Template database 132 contains data for determining what events to assemble for a user schedule 152 based on the content of a user profile (e.g., first user profile 140) and is generated by template engine 138. Template database 132 contains current templates 136 and past template archive 134. Past template archive 134 contains a record of past templates and schedules. First event 112, second event 114, third event 116, and fourth event 118 are retrieved into user schedule 152 in master schedule database 176 by integrated control manager data processing system 102 through the sending of queries, which queries are based on current templates 136, to information technology schedule database 104, ISO schedule database 106, and health and environment schedule database 108. For purposes of explanation, the example illustrated with respect to FIG. 1 operates on the assumption that integrated control manager data processing system 102 will have access to information, stored in current templates 136 relating to the location among information technology schedule database 104, ISO schedule database 106, and health and environment schedule database 108 at which first event 112 and third event 116 can be accessed. With respect to second event 114 and fourth event 118, the example illustrated with respect to FIG. 1 assumes that no location data is available to integrated control manager data processing system 102 that would be helpful in ascertaining the location of the events among information technology schedule database 104, ISO schedule database 106, and health and environment schedule database 108 of second event 114 and fourth event 118.

A client, such as first client 128, can communicate directly with a database, such as ISO schedule database 106, through messages, such as client-to-database message 178 and database-to-client message 180.

The process for managing database records with events located in multiple registries in accordance with a preferred embodiment of the present invention, described in detail below with respect to FIG. 4, will result in the sending and receiving of several messages. As examples of these messages, first query message 160 contains first query 120, directed to information technology schedule database 104, and includes a request for first event 112, second event 114 and fourth event 118. No request for third event 116 is included in first query 120, because location data is available to integrated control manager data processing system 102 that indicates the presence of third event 116 on health and environment schedule database 108. The response to first query 120 arrives at integrated control manager data processing system 102 in the form of first event message 162, which contains first event 112 and data acknowledging the absence from information technology schedule database 104 of second event 114 and fourth event 118.

Similarly, second query message 164 contains second query 122, directed to ISO schedule database 106, and includes a request for second event 114 and fourth event 118. No request for third event 116 is included in second query 122, because location data is available to integrated control manager data processing system 102 that indicates the presence of third event 116 on health and environment schedule database 108. Likewise, no request for first event 112 is included in second query 122, because integrated control manager data processing system 102 received first event 112 in first event message 162. The response to second query 122 arrives at integrated control manager data processing system 102 in the form of second event message 166, which contains second event 114 and data acknowledging the absence from ISO schedule database 106 of fourth event 118.

As a final example, third query message 168 contains third query 124, directed to health and environment schedule database 108, and includes a request for third event 116 and fourth event 118. No request for first event 112 or second event 114 is included in third query 124, because integrated control manager data processing system 102 received first event 112 in first event message 162 and received second event 114 in second event message 166. The response to third query 124 arrives at integrated control manager data processing system 102 in the form of third event message 170, which contains third event 116 and data acknowledging the absence from health and environment schedule database 108 of fourth event 118.

Figure 2:
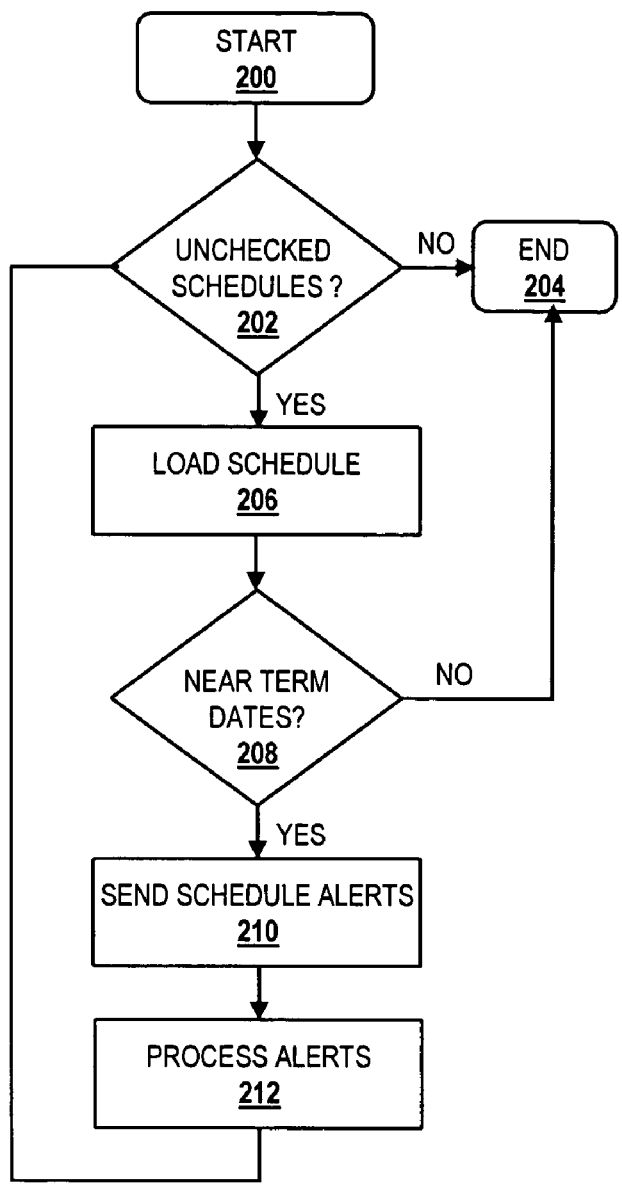
FIG. 2 is a high-level logical flowchart of a process for checking a schedule and sending notices in performing business control task notification in accordance with a preferred embodiment of the present invention.

Turning now to FIG. 2, a high-level logical flowchart of a process for checking a schedule and sending notices and performing business control task notification in accordance with the preferred embodiment of the present invention is depicted. The process starts at step 200, which will typically correspond to activation of master schedule database 176 on integrated business control manager 102. The process next moves to step 202. At step 202, master schedule database 176 verifies whether any schedules exist, which have not been checked recently for near-term event dates. If no such unchecked schedules exist, then the process ends at step 204. If unchecked schedules exist, then the process next moves to step 206, which depicts master schedule database 176 loading user schedule 152. The process then proceeds to step 208.

At step 208, master schedule database 176 on integrated business control manager 102 examines user schedule 152 for events with near-term dates. This examination for near term dates is accomplished by reviewing the required performance dates in first event 112, second event 114, third event 116 and fourth event 118. If events with near term dates do not exist, then the process ends at step 204. If events with near term dates do exist, then the process next moves to step 210.

At step 210, master schedule database 176 sends a schedule alert 186, containing any events with near-term required performance dates to notification engine 126. The process next moves to step 212, which depicts notification engine 126 processing schedule alert 186 by sending a notification 158 to second client 130. The process then returns to step 202, which is described above.

Figure 3:
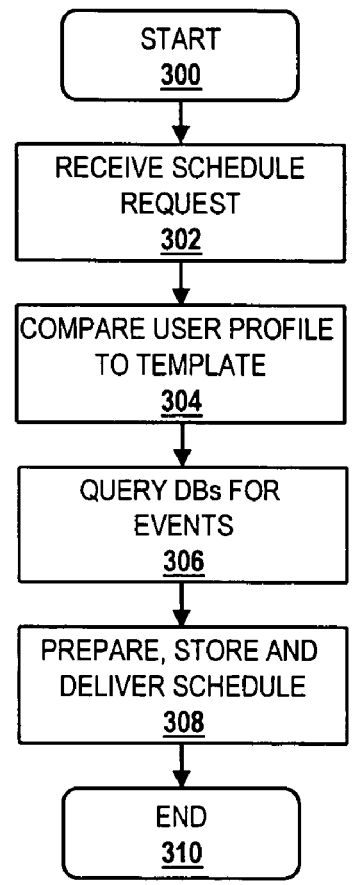
FIG. 3 is a high-level logical flowchart of a process for preparing a schedule in performing business control task notification in accordance with a preferred embodiment of the present invention.

With reference now to FIG. 3, a high-level logical flowchart of a process for preparing a schedule and performing business control task notification in accordance with a preferred embodiment of the present invention is illustrated. The process starts at step 300, which corresponds to activation of notification engine 126. The process then moves to step 302. At step 302, notification engine 126 receives a schedule request 154 from first client 128. The process then proceeds to step 304, which depicts integrated business control manager 102 comparing a user profile, such as fourth user profile 148 to data from current templates 136 in compliance with schedule request 154. This is accomplished as notification engine 126 sends a query request 188 to query engine 190. Query engine 190 then sends a profile request 196 to user profiles 142 and receives a user profile such as fourth user profile 148 in a profile reply 198. Query engine 190 then sends a template request 192 to template database 132 and the template database replies by sending an appropriate subset of current templates 136 in a template reply 194 to query engine 190.

The process next moves to step 306. At step 306, query engine 190 queries databases for attributes called for in the template from among current templates 136 received in template reply 194, as is detailed below with respect to FIG. 4. Upon receipt of responses to database queries as a part of the process of step 306, the process then moves to step 308. At step 308, master schedule database 176 prepares, delivers, and stores a user schedule 152. Delivery of a schedule can be accomplished by sending a schedule alert 186 to notification engine 156. The process then ends at step 310.

Figure 4:
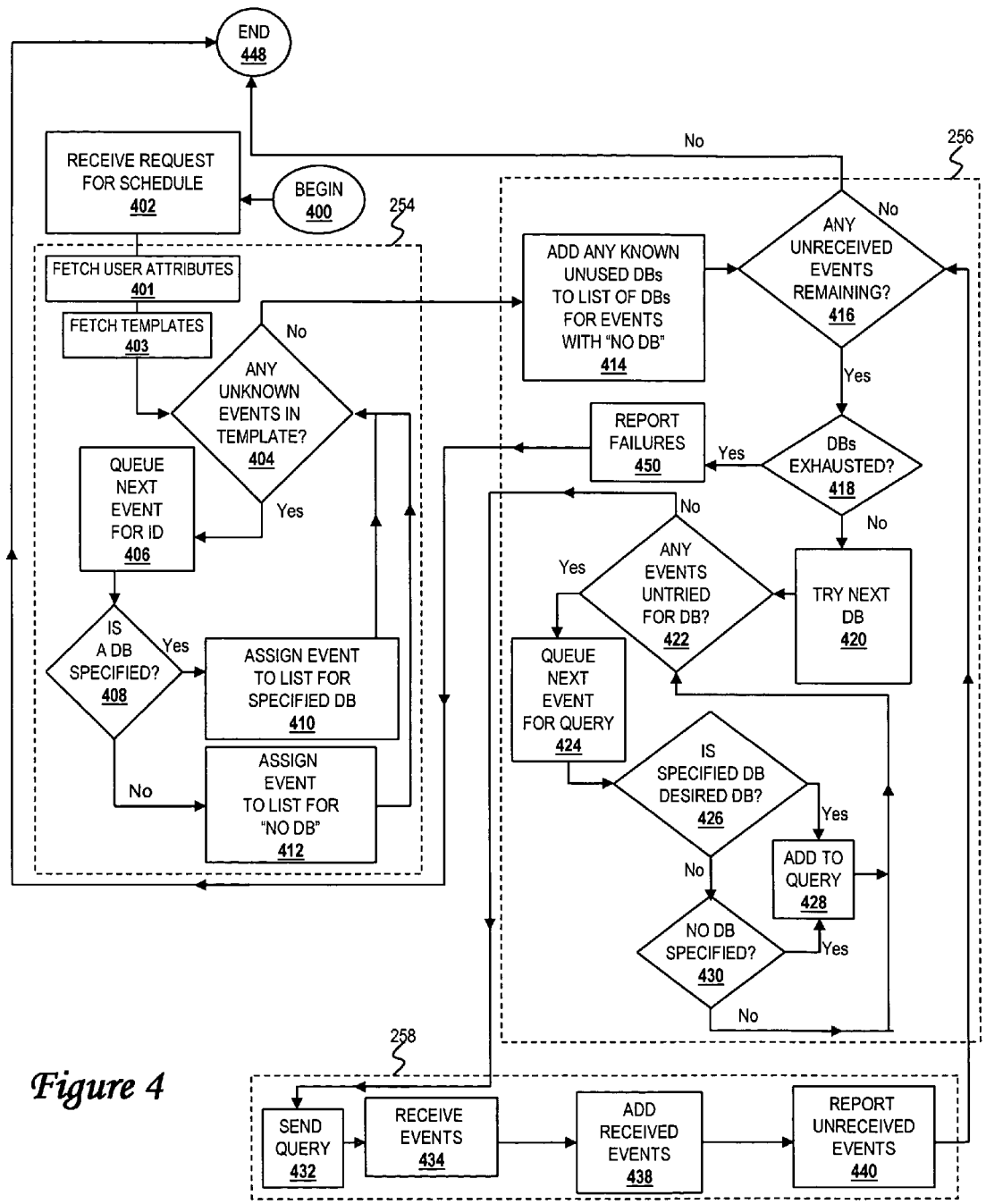
FIG. 4 is a high-level logical flowchart of a process for querying schedule databases in performing business control task notification in accordance with a preferred embodiment of the present invention.

With reference now to FIG. 4, there is depicted a high-level logical flowchart of a process for managing database records with events located in multiple registries in accordance with a preferred embodiment of the present invention. While the process of FIG. 4 has been illustrated in a simplified embodiment as a logical flowchart, wherein single operations are explained sequentially for the purpose of explanatory clarity, one skilled in the art will quickly recognize that the process depicted in FIG. 4 can be separated into a group of interacting processes, operating as modules or program objects in parallel processes and interacting with one another.

Among these subprocesses, which can be described as modules and whose parts will be explained in greater detail below, assignment module 454 comprises steps 404-412. Assignment module 454 performs steps related to identifying whether, for each requested event, a known schedule database location exists, such as information technology schedule database 104 as a location for first event 112. As will be detailed below, with respect to the example portrayed in FIG. 1, the steps of assignment module 454 include analysis by integrated control manager data processing system 102 of current templates 136 in template database 132 as to which schedule database can appropriately provide a given event, and the assignment of the event to a list, which is then used by integrated control manager data processing system 102 in query preparation module 456.

Query preparation module 456 comprises steps 414-430 and step 450. Query preparation module 456 prepares queries for integrated control manager data processing system 102 to send to databases across network 100. The third module, query communication module 458, includes steps 432-440 and sends queries to databases across network 100.

The process of FIG. 4 begins at step 400, which depicts integrated control manager data processing system 102 beginning the process of creating a schedule by accessing, distributing and modifying events in databases that are distributed across multiple data processing systems connected to a network. Step 400 typically involves activation of a query process on integrated control manager data processing system 102, and activation may come from a user or an automated query. The process then proceeds to step 402, which illustrates integrated control manager data processing system 102 receiving schedule request 154. Schedule request 154 is received at notification engine 126. As depicted with respect to the example in FIG. 1, integrated control manager data processing system 102 processes a query for four events of one or more records. The requested events are first event 112, second event 114, third event 116, and fourth event 118.

The process of FIG. 4 next moves to step 404, which is part of an assignment subprocess, previously identified as assignment module 454. Step 404 depicts integrated control manager data processing system 102 determining whether any requested events (e.g., first event 112, second event 114, third event 116, and fourth event 118) remain in an 'unassigned' condition. For purposes of the discussion with respect to FIG. 4 in light of the example described with respect to FIG. 1, an unassigned condition exists whenever, with respect to one of first event 112, second event 114, third event 116, and fourth event 118, integrated control manager data processing system 102 does not possess information as to the location among information technology schedule database 104, ISO schedule database 106 and health and environment schedule database 108 on which the needed event is stored. If the location of all desired events is known, then the process of FIG. 4 moves to step 414 in query formation module 456, which is described in detail below.

If, however, as in the example portrayed in FIG. 1, there exist events in an unassigned condition, for which location data is not available on integrated control manager data processing system 102, then the process of FIG. 4 next proceeds to step 406, which illustrates integrated control manager data processing system 102 queuing a next event for identification of its location. The process then moves to step 408, which illustrates integrated control manager data processing system 102 determining whether a database from among those to which integrated control manager data processing system 102 can send queries (e.g., information technology schedule database 104, ISO schedule database 106 and health and environment schedule database 108) is assigned to provide the event in question. The determination as to whether a database among those to which integrated control manager data processing system 102 can send queries is assigned to provide the event in question can be made from data received in a request to access events in step 402, from data stored on integrated control manager data processing system 102 or from data stored by other sources.

If a database is specified for the event in question, the process then moves to step 410 which depicts integrated control manager data processing system 102 assigning the event in question to a location list for the specified database. With respect to the example portrayed in FIG. 1, because the location of first event 112 on information technology schedule database 104 is known, integrated control manager data processing system 102 assigns first event 112 to the list of events to be queried from information technology schedule database 104. Similarly, because the location of third event 116 on health and environment schedule database 108 is known, integrated control manager data processing system 102 assigns third event 116 to the list of events to be queried from health and environment schedule database 108.

In step 408, if no location data is available for first event 112, then the process proceeds to step 412, which depicts integrated control manager data processing system 102 assigning an event to the list of events for which no database is known. In the example depicted in FIG. 1, database locations are assigned and known for first event 112 and third event 116, which would be assigned to query lists for their respective information technology schedule database 104 and health and environment schedule database 108. However, no location data is available for second event 114 and fourth event 118. Second event 114 and fourth event 118 would be assigned to the query list for those events for which no database location data is known. After the completion of step 410 or the completion of step 412, the process returns to step 404.

If, in step 404, no events remain which have not been assigned to the lists for a particular database or to the list for which no database location is known, the process then enters query preparation module 456 as the process moves to step 414. Step 414 illustrates integrated control manager data processing system 102 adding any known unused database location data to the list of databases which will be queried with respect to events for which no location database is known. This data will typically be available from database configuration 110.

The process of FIG. 4 then proceeds to step 416, which depicts integrated control manager data processing system 102 determining whether any unreceived events remain. If no unreceived events remain, then the process leaves query preparation module 456 and enters return module 460 as the process moves to step 442, which will be described in detail below.

If any unreceived events remain, then the process of FIG. 4 proceeds to step 418, which illustrates integrated control manager data processing system 102 determining whether it has exhausted all of the possible databases that are available to receive queries for any unreceived events. The databases, which are available to receive queries for unreceived events, will include those databases referenced in information stored on integrated control manager data processing system 102, those databases referenced in information received from database configuration 110, and those databases referenced in any information received in response to queries to previously queried databases. An individual database is exhausted after a query has been sent to it.

If the available databases have not been exhausted, then the process moves to step 420, which depicts integrated control manager data processing system 102 queuing the next event for possible addition to the query, which is being prepared for transmission to the current database selected in step 420. The process then proceeds to step 422, which depicts integrated control manager data processing system 102 determining whether any of the desired events remain untried for the current database selected in step 420. This step involves determining whether each of the unreceived events has been tried for the current database selected in step 440.

If, in step 422, untried events remain, then the process of the preferred embodiment will move to step 424, which illustrates the integrated control manager data processing system 102 designating the next event for possible addition to the query being sent the current database selected in step 420. The process then proceeds to step 426, which depicts integrated control manager data processing system 102 determining whether the database specified in step 424 to receive the query currently being formed is the desired database that is assigned as containing the event under consideration. To determine if the database specified in step 424 to receive the query currently being formed in query formation module 456 is the desired database that is assigned as containing the event under consideration, integrated control manager data processing system 102 refers to the list prepared in assignment module 454 for the current database selected in step 420, and ascertains whether the current event contained is identified on the list generated in assignment module 454. If the specified database being tried is the desired database, which is known to contain the required event, then the process moves to step 428, which depicts integrated control manager data processing system adding the current event to the query for the current database.

If in step 426, the specified database is not the desired database, the process proceeds to step 430, which illustrates integrated control manager data processing system determining whether any database is specified with respect to the event under consideration. Integrated control manager data processing system 102 determines that no database is specified for an event by searching for the current event in the list prepared by assignment module 454, containing those events for which no database was specified. If no database is specified for the event under consideration, the process moves to step 428, in which integrated control manager data processing system 102 adds the event under consideration, for which no location data is available, to the query being prepared for the current database selected in step 420.

If a specified database is available but the current database is not the specified database, then the process returns to step 422, which is discussed above. Returning to step 422, if no events remain untried for the current database, then the process moves to step 432, which depicts sending a query to the current database.

In the example illustrated with respect to FIG. 1, three queries are presented. First query 120 is a query for first event 112, fourth event 118, and second event 114. Second query 122 is a query requesting second event 114 and fourth event 118. Third query 124 requests third event 116 and fourth event 118.

Returning to FIG. 4, the process of FIG. 4 next passes to step 434, which illustrates client data processing 102 receiving events. As noted above, sending query 120 as a first query message 160 would result in the return of event 112 in first event message 162. Similarly, sending second query 122 as second query message 164 would result in receipt of second event 114 as second event message 166, and sending third query 124 as third query message 168 would result in receipt of third event 116 as third event message 170. The process then proceeds to step 436, wherein integrated control manager data processing system 102 stores location data for the events that it has received in step 434. The process next moves to step 438, which depicts integrated control manager data processing system performing operations on or with the received events. Operations performed on the received events will vary from embodiment to embodiment, and can include any operation that would be performed in the conventional. The process of FIG. 4 next proceeds to step 440, which depicts the recording on un-received events, and is then followed by a return to step 416, which is discussed above.

Returning to step 416, if integrated control manager data processing system determines that no un-received events remain, the process next moves to step 442, which depicts integrated control manager data processing system 102 determining whether a return of any events is required. If the return of events is required, the process of FIG. 4 then proceeds to step 444, which depicts modification of events which require modification. The process then moves to step 446, which depicts replacing the modified events in their original databases by reference to the stored location information. The process then ends at step 448. If, in step 442, integrated control manager data processing system 102 determines that no events require modification, then the process of FIG. 4 next moves to step 448, where it ends.

Returning to step 418, if, in step 418 integrated control manager data processing system 102 determines that all of its available databases have been queried and there are events that have not been found in any database, then the process moves to step 450, which illustrates integrated control manager data processing system reporting failures and ends at step 448.

Figure 5:
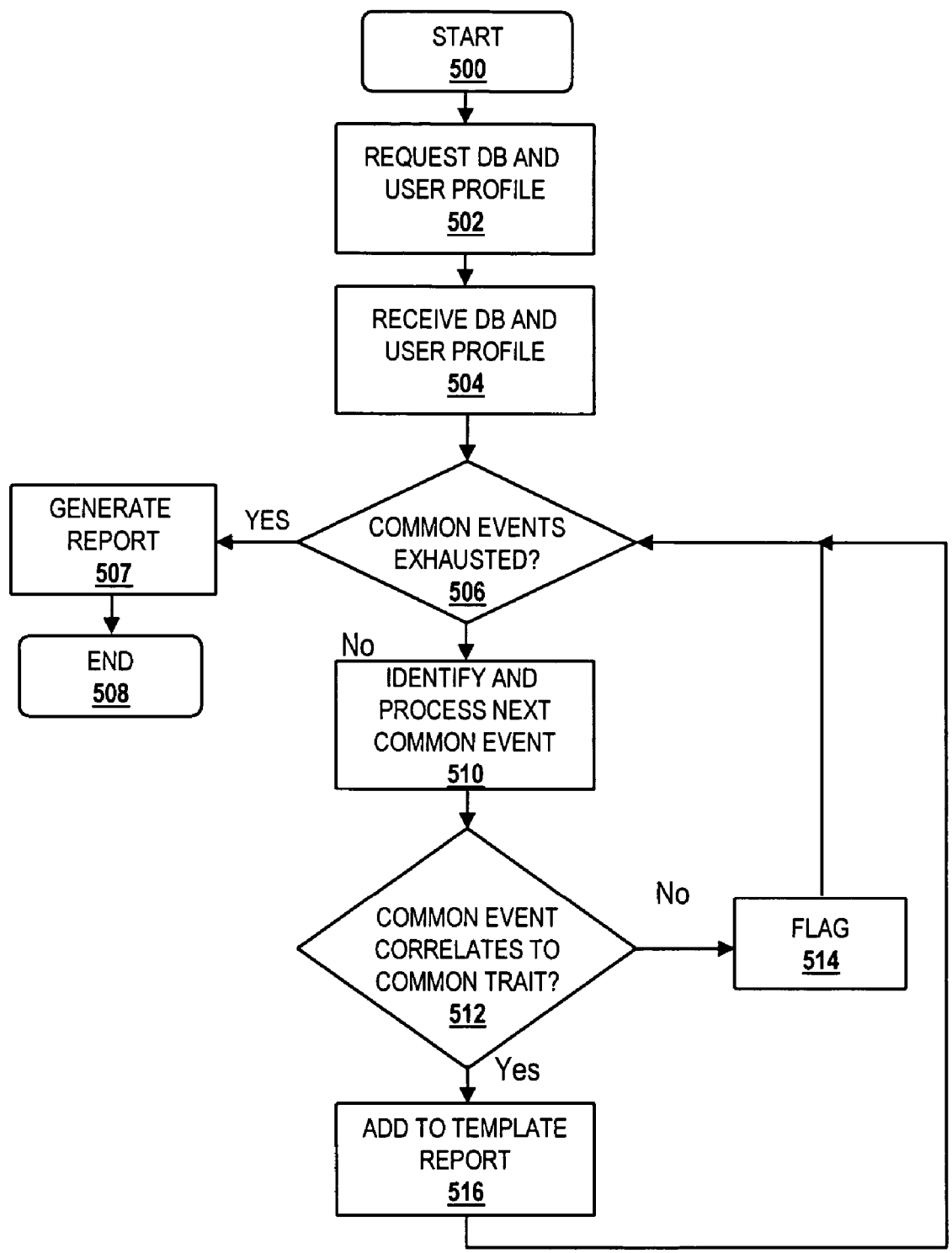
FIG. 5 is a high-level logical flowchart of a process for preparing template data in performing business control task notification in accordance with a preferred embodiment of the present invention.

Turning now to FIG. 5, a high-level logical flowchart of a process for preparing template data and performing business control task notification in accordance with the preferred embodiment of the present invention as depicted. The process starts at step 500, which corresponds to activation of template engine 138. The process next proceeds to step 502. Step 502 depicts template engine 138 requesting a database and a user profile. Template engine 138 requests a user profile by sending profile request 182 to user profiles 142. Template engine 138 requests a database by sending database request 172 to a database such as health and environmental schedule database 108. The process then moves to step 504 which depicts template engine receiving a database and a user profile. As depicted in the example illustrated in FIG. 1, template engine 138 receives a profile result transmission 184 containing first user profile 140, second user profile 144, third user profile 146 and fourth user profile 148. Template engine 138 also receives health and environment schedule database as part of database result transmission 174. The process then moves to step 506. Step 506 depicts template engine 138 determining whether it has exhausted available common events from first user profile 140, second user profile 144, third user profile 146 and fourth user profile 148. If common events from first user profile 140, second user profile 144, third user profile 146 and fourth user profile 148 have been exhausted, then the process proceeds to step 507, which depicts template engine generating a report. A template report 199 is sent to template database 132, and the process then ends at step 508.

If at step 506, common events from first user profile 140, second user profile 144, third user profile 146 and fourth user profile 148 have not been exhausted, then the process proceeds to step 510, which depicts template engine 138 identifying and processing a next common event from among two or more of first user profile 140, second user profile 144, third user profile 146 and fourth user profile 148. The process then moves to step 512, which depicts template engine 138 determining whether the common event processed in step 510 correlates to a common trait. If the common event correlates to no discernable common trait, then the process proceeds to step 514, which depicts template engine 138 flagging the common event for later processing. If the common event correlates to a common trait in step 512, then the process next moves to step 516. Step 516 depicts template engine 138 adding the common event and common trait to template report 199.

As has been described, the present invention provides a system, method and computer program product for accessing and distributing events in business control database that are distributed across multiple data processing systems connected to a network. The present invention provides facilities for sending a queries from a local integrated control manager data processing system to a remote database, wherein that query is composed of requests for events known to be stored on the database and events whose location is unknown. Once an event is received from a remote database, the present invention provides facilities for creating schedules and for notifying clients. The present invention improves interaction between clients and business control databases by providing an orderly and methodical system for dealing with events distributed across multiple databases.

While the invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

The present invention has been described in relation to particular embodiments that are intended in all respects to be illustrative rather than restrictive. Although specific terms are used, the description thus given uses terminology in a generic and descriptive sense only and not for purposes of limitation.

What is claimed is:

1. A method for performing business control task notification, said method comprising:
    processing a combination of one or more databases and one or more user profiles to generate a schedule template;
    receiving a request for a schedule;
    comparing attributes of said request for said schedule to a user profile and a schedule template to identify one or more events of said schedule template to be accessed from one or more of a plurality of distributed databases;
    forming a query to be sent to said one or more distributed databases;
    sending said query to a particular database among said plurality of distributed databases;
    receiving a positive response to said query, indicating that said particular database contains said first event for said record, and said event;
    in response to receiving said event, creating said schedule;
    storing said schedule;
    identifying one or more current events in said schedule requiring a notification; and
    sending said notification to a destination.

2. The method of claim 1, wherein said step of comparing attributes of said request for said schedule to a user profile and a schedule template further comprises identifying one or more events of said schedule template to be accessed from one or more of a plurality of distributed databases, wherein a first event among said one or more events resides in an unknown database among said plurality of databases and it is known that a second event resides in a particular database among said plurality of databases.

3. The method of claim 2, wherein said step of forming a query to be sent to said one or more distributed databases further comprises forming a query which query includes a request for said first event and a request for said second event.

4. The method of claim 1, wherein said step of processing a combination of one or more databases and one or more user profiles to generate a schedule template further comprises allowing an authorized user to edit said template.

5. The method of claim 1, wherein said step of sending said notification further comprises disabling reproduction of said notification.

6. The method of claim 1, wherein said step of sending said notification further comprises disabling sharing of said notification.

7. The method of claim 1, wherein said step of sending said notification further comprises disabling retransmission of said notification.

8. The method of claim 1, wherein said step of processing a combination of one or more databases and one or more user profiles to generate a schedule template further comprises:
    requesting one or more user profiles and one or more databases;
    receiving one or more user profiles and one or more databases;
    identifying a common event in said one or more databases that is common to one or more user profiles;
    identifying a common trait associated with said common event; and
    adding said common event to said schedule template.

* * * * *